United States Patent [19]
Chow

[11] Patent Number: 6,038,658
[45] Date of Patent: Mar. 14, 2000

[54] METHODS AND APPARATUS TO MINIMIZE THE NUMBER OF STALL LATCHES IN A PIPELINE

[75] Inventor: Michael Y. Chow, Cupertino, Calif.

[73] Assignee: Intel Corporation, Santa Clara, Calif.

[21] Appl. No.: 08/962,811

[22] Filed: Nov. 3, 1997

[51] Int. Cl.[7] ....................................................... G06F 9/00
[52] U.S. Cl. .......................... 712/219; 712/235; 713/500; 711/140; 711/169
[58] Field of Search ............................. 709/400; 713/500; 712/219, 233, 235, 236; 711/140, 169

[56] References Cited

U.S. PATENT DOCUMENTS 4,382,299  5/1983  Dieterich ................................... 360/32

OTHER PUBLICATIONS

R. J. Baron and L. Higbie, Computer Architecture (Addison–Wesley Publ. Co. 1994) Chapter 6, pp. 284–297.

Primary Examiner—Meng-Ai T. An
Assistant Examiner—Mackly Monestime
Attorney, Agent, or Firm—Blakely, Sokoloff, Taylor & Zafman LLP

[57] ABSTRACT

The invention comprises in several embodiments a pipeline and a method of operating the pipeline. The pipeline comprises first and second stages each having an output. The first stage is located earlier in the pipeline than the second stage. A first isolation device has an input coupled to the output of the first stage. The first isolation device is for storing data received from the first stage. A second isolation device has an input coupled to the output of the second stage. The second isolation device is for storing data received from the second stage. A stall control is for sending a signal to the first and second isolation devices. The signal is to stall the isolation devices. At least one delay element is connected between the stall control and the second isolation device and is to delay receipt of the signal by the second isolation device.

26 Claims, 10 Drawing Sheets

METHODS AND APPARATUS TO MINIMIZE THE NUMBER OF STALL LATCHES IN A PIPELINE

BACKGROUND OF THE INVENTION

1. Field of the Invention

The present invention relates generally to the field of computer hardware, and more specifically, to a method and an apparatus that lower the number of stall latches in pipelines.

2. Description of the Related Art

Modern processors frequently execute several operations and/or instructions in parallel, because parallel execution can increase operating speed. A structure executing several instructions in parallel employs devices to isolate data associated with one instruction from mixing with data associated with another instruction. One such structure is a pipeline. A pipeline uses a series of stages to execute each instruction. A pipeline processes different instructions in parallel by keeping the data from each instruction in a different stage at any one time.

FIG. 1(A) illustrates a generic four stage pipeline 8. Data or instructions enter at an input 10. The input 10 is the first stage of the pipeline 8. After passing through four execution stages 12, 14, 16, 18, the results are transmitted to an output 20. The output 20 is the last stage of the pipeline 8. In the pipeline 8, isolation devices 22, 24, 26, 28, 30 connect the stages 10, 12, 14, 16, 18, 20. In response to receiving a first timing pulse delivered by a timer 32, the isolation devices 22, 24, 26, 28, 30 store all data from the preceding stage 10, 12, 14, 16, 18. In response to receiving a second timing pulse delivered the timer 32, the isolation devices 22, 24, 26, 28, 30 transmit all stored data to the following stage 12, 14, 16, 18, 20. In some pipelines, the first and second timing pulses are the same pulse. The steps of storing data are triggered simultaneously in each isolation device 22, 24, 26, 28, 30 by each first timing pulse. The steps of transmitting stored data are triggered simultaneously in each isolation device 22, 24, 26, 28, 30 by each second timing pulse. The simultaneous triggering of the storage and transmission of data ensures that the results for different instructions do not mix in the pipeline 8.

In the prior art, the isolation devices 22, 24, 26, 28, 30 are typically banks of latches, D flip-flops (DFF) or more complicated sequential logic units. Since latches and flip-flops store and transmit one bit of information at a time, the number of latches or flip-flops employed by each isolation device 22, 24, 26, 28, 30 is a function of the quantity of information that is stored and transmitted between the particular stages 10, 12, 14, 16, 18, 20 of the pipeline 8. In some pipelines, the amount of data is substantially larger at early stages and smaller at later stages.

FIG. 1(B) is a graph illustrating the amount of data at each stage of a floating-point multiplication pipeline (FMP) with four execution stages. The solid curve 34 shows a situation where much more data is transmitted between early pipeline stages, e.g., between stages 12, 14, 16 of FIG. 1(A), than between later stages, e.g., between stages 16, 18, 20 of FIG. 1(A). In a FMP, there is much more data in early stages, because many partial products are calculated during early stages. The partial products are summed in later stages, resulting in much less data. Other types of pipelines also frequently transmit much more data between particular pipeline stages.

Referring to FIGS. 1(A),(B), data storage and transmission involves many more latches or flip-flops (not shown) in the isolation devices 24, 26 located between the earlier stages 12, 14, 16. The large number of latches or flip-flops used by the isolation devices 24, 26 may cause undesirable side effects. First, the large number of latches or flip-flops may substantially increase the area of a chip (not shown) that is occupied by the pipeline 8. Second, since a large number of latches or flip-flops are connected to the timer 32, the timing pulses to these latches or flip-flops may be substantially weakened and require the introduction of boosters (not shown). The boosters will take up even more precious area on the chip. These undesirable side effects are significantly more serious in pipelines employing latches or flip-flops that can be stalled, generically referred to as stall latches.

FIGS. 2(A)–(C) form a chart illustrating the operation of a stall in the four stage pipeline 8 of FIG. 1(A). At an initial time, the pipeline 8 contains data from different instructions A, B, C, D and E stored in the isolation devices 22, 24, 26, 28, 30 between the various stages 10, 12, 14, 16, 18, 20 of the pipeline 8. At the initial time, the stall control 38 sends a stall signal to the isolation devices 22, 24 located between the first three stages 10, 12, 14. The length of the stall and the latest isolation device 24 stalled are generally dependent on the reason for the stall and may vary in different pipelines and, in the same pipeline, may vary at different times. For the illustrative example of FIGS. 2(A)–(C) the stall is assumed to last for three timing pulses and to effect all isolation devices 22, 24 earlier in the pipeline than the second execution stage 14. The stall control 38 sends the stall signal during three timing pulses. The first two isolation devices 22, 24 are stalled from storing data from the preceding pipeline stages 10, 12, and from transmitting stored data to the following pipeline stages 12, 14 during the three timing pulses that the stall signal is received. In some pipelines, the signal from the stall control 38 stalls isolation devices 22, 24 from storing data from the preceding pipeline stages 10, 12 without stalling the transmission of already stored data. At the initial time, the stall signal freezes further progress of the execution of instructions A and B by the pipeline 8.

The reasons for a stall may depend on circumstances external to the pipeline 8. For example, an external device (not shown) may have determined that a register (not shown) will not be available to store the result from instruction B for a certain number of timing cycles. The external device requests the stall to ensure that the result from instruction B is not transmitted to the output 20 before the register is available. In a second example, an external control (not shown) of the pipeline 8 requests the stall, because a later pipeline stage, for example the fourth execution stage 18, will not be able to execute instruction B without supplemental data from another source. The supplemental data is delayed, and the stall gives time for that data to be provided.

FIG. 2(B) illustrates the same pipeline two timing pulses later. Instructions C, D, and E, which were initially in later isolation devices 26, 28, 30 have continued their progress through the pipeline 8. The isolation devices 22, 24 continue to be stalled by the signal that the stall control 38 continues to send. Instructions A and B are still stored in the isolation devices 22, 24 between the first three stages 10, 12, 14 of the pipeline 8. The stall results in a bubble of nonsense execution data in the third and fourth isolation devices 26, 28.

FIG. 2(C) illustrates the condition of the pipeline six timing pulses after the initiation of the stall. The stall control 38 stopped sending the stall signal three timing pulses earlier, and the first two isolation devices 22, 24 thereafter started transmitting stored data and storing data again. The instructions A, B have progressed through the third and fourth stages 16, 18 of the pipeline 8 respectively during those three unstalled timing pulses. The bubble of nonsense execution data is discarded at the output 20. Starting with the arrival of instruction B at the next timing pulse, the results from the pipeline 8 will be treated normally at the output 20.

FIG. 3 illustrates a typical stall latch 40 that may be used in the banks of latches or flip-flops of the first two isolation devices 22, 24 of FIGS. 1(A) and 2(A)–(C). The stall latch 40 has a D flip-flop (DFF) 46. A feedback loop 48 connects the output 50 of the DFF 46 to one input 52 of a 2 to 1 multiplexer (MUX) 54. The second input 56 of the MUX 54 is an input for logical data from an earlier stage 42 of the pipeline. The output 50 of the DFF 46 forms an input for logical data to a following stage 44 of the pipeline. An input 58 of the DFF 46 is connected to an output 60 of the MUX 54. The stall control 38 of FIGS. 1 and 2 selects one of the two inputs 52, 56 of the MUX 54. At each timing pulse delivered by the timer 32, the DFF 46 stores data from the output 60 of the MUX 54. During the same timing pulse, the DFF 46 transmits its stored data to the following stage 44 and to the input 52 of the MUX 54 via the feedback loop 48.

In the transmit configuration, the stall control 38 output is at a logical low selecting the input 56 of the MUX 54. The DFF 46 transmits stored data to the following stage 44, and provided that the MUX 54 has finished setting up before the timing pulse is received by the DFF 46, the DFF 46 stores data from the earlier stage 42 appearing at the output 60 of the MUX 54. In the stall configuration, the stall control 38 sends a logical high signal selecting the input 52 of the MUX 54. At each timing pulse, data stored in the DFF 46 is transmitted to the following stage 44 and to the input 52 of the MUX 54 by the feedback loop 48. The DFF 46 also stores data from the output 60 of the MUX 54 at each timing pulse, but the data stored is the same data that was stored in the DFF 46 before the timing pulse. In the stall configuration, the data stored by the latch 40 continues to be transmitted to the following stage with each timing pulse, but same data is restored in the DFF 46. Thus, the stall latch 40 does not store data from the earlier stage 42 while in the stall configuration.

As illustrated in FIG. 3, stall latches 40 typically have more elements than regular latches or flip-flops. Stall latches 40 slow pipeline operation, due to setup times associated with the additional elements. Stall latches 40 use more area on a chip surface (not shown) than regular latches or flip-flops, due to the additional elements. In pipelines that use a large number of latches in particular isolation devices, for example the first two isolation devices 22, 24 of the pipeline illustrated by FIGS. 1 (A)–(B), a large area of the chip surface is used when stall latches 40 are employed in those particular isolation devices 22, 24. Besides the increased chip space and time delays, connections from the stall control 38 become problematic when the stall latches 40 are used in those particular isolation devices 22, 24. In those particular isolation devices 22, 24, capacitance's between the many adjacent control lines from the stall control 38 ordinarily weaken signals. In such cases, voltage booster devices (not shown in FIG. 3) are generally employed to boost signals to the target stall latches 40. The voltage boosters take up even more costly space on the chip and use additional setup time diminishing the time window for stall initiation.

The present invention is directed to overcoming, or at least reducing the effects of, one or more of the problems set forth above.

SUMMARY OF THE INVENTION

The invention comprises in several embodiments a pipeline and a method of operating the pipeline. The pipeline comprises first and second stages each having an output. The first stage is located earlier in the pipeline than the second stage. A first isolation device has an input coupled to the output of the first stage. The first isolation device is for storing data received from the first stage. A second isolation device has an input coupled to the output of the second stage. The second isolation device is for storing data received from the second stage. A stall control is for sending a signal to the first and second isolation devices. The signal is to stall the isolation devices. At least one delay element is connected between the stall control and the second isolation device and is for delaying receipt of the signal by the second isolation device.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Illustrated embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
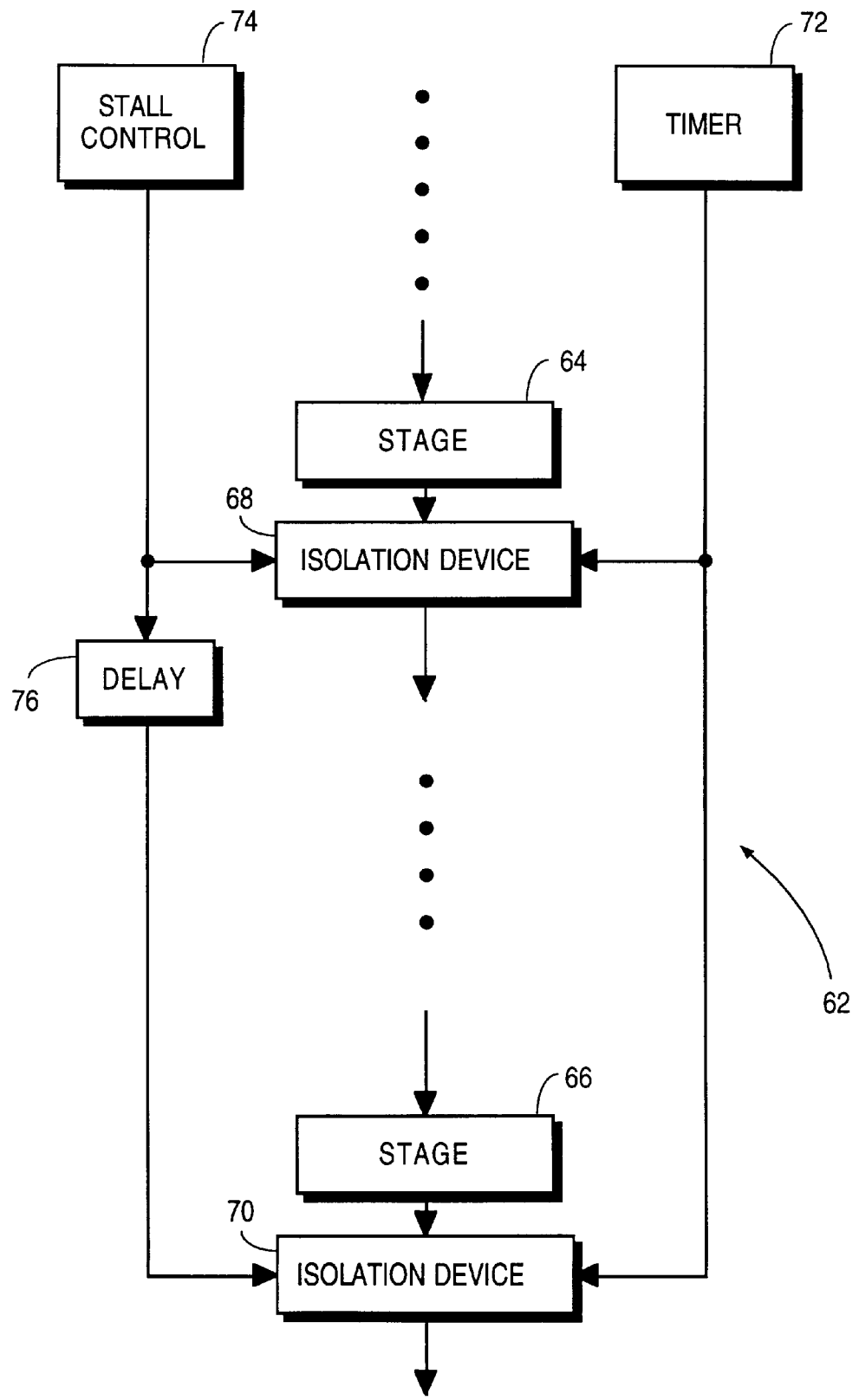
FIG. 4 illustrates one embodiment for eliminating stall latches from the interior of a pipeline.

FIG. 4 illustrates one embodiment for eliminating stall latches from a pipeline 62. The pipeline may, for example, be part of a processor (not shown). The pipeline 62 has at least a first stage 64 and a second stage 66. The first stage 64 is earlier in the pipeline 62 than the second stage 66. The pipeline 62 has at least a first isolation device 68 following the first stage 64 and a second isolation device 70 following the second stage 66. The first and second isolation devices 68, 70 are capable of recording logical data from inputs that are coupled to outputs of the first and second stages 64, 66 respectively. In some embodiments, the first and second isolation devices 68, 70 receive timing pulses delivered by a timer 72 simultaneously and store data in response to receiving one of the timing pulses. The isolation devices 68, 70 are banks of stallable latches. The structure and construction of banks of stallable latches is known in the art, and, therefore will not be discussed in detail herein so as not to obscure the details of the instant invention. The pipeline 62 has a stall control 74. The stall control 74 is capable of sending a stall signal to the isolation devices 68, 70. In response to receiving the stall signal, the first and second isolation devices 68, 70 do not store data from the stage 64, 66 preceding the respective isolation device 68, 70. The pipeline 62 has a delay element 76 that delays the receipt of the stall signal by the second isolation device 70. The stall starts later in the second isolation device 70 because of the delay element 76. In one embodiment, the stall signal is delayed by a period of time sufficiently long to allow data present in an earlier isolation device (not shown) to propagate to and to be stored in the second isolation device 70. The construction of a delay element 76 capable of delaying the stall signal during is known in the art.

Figure 5A:
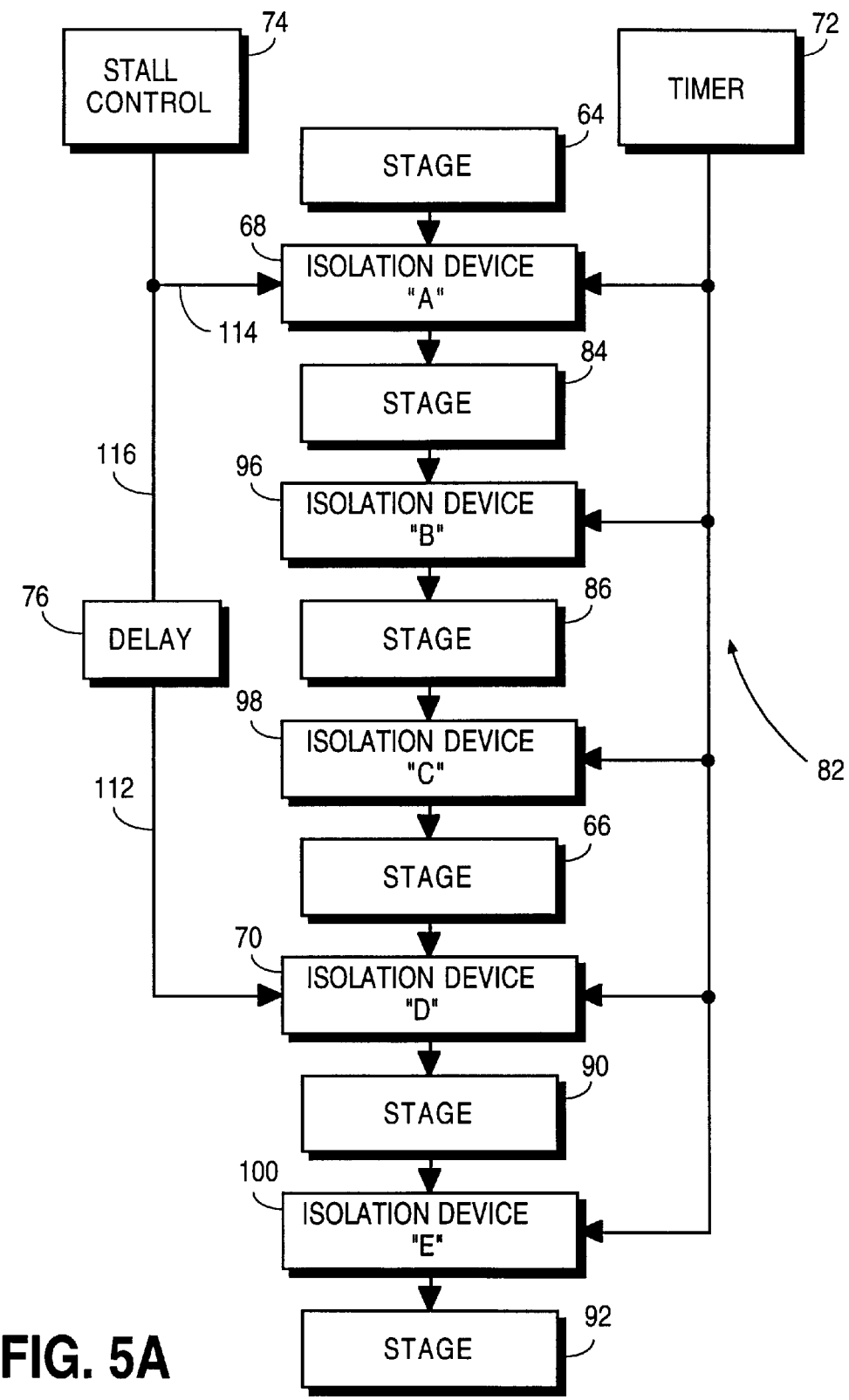
FIGS. 5(A)–(C) illustrate the progression of a stall in the specific embodiment of FIG. 4.
Figure 5B:
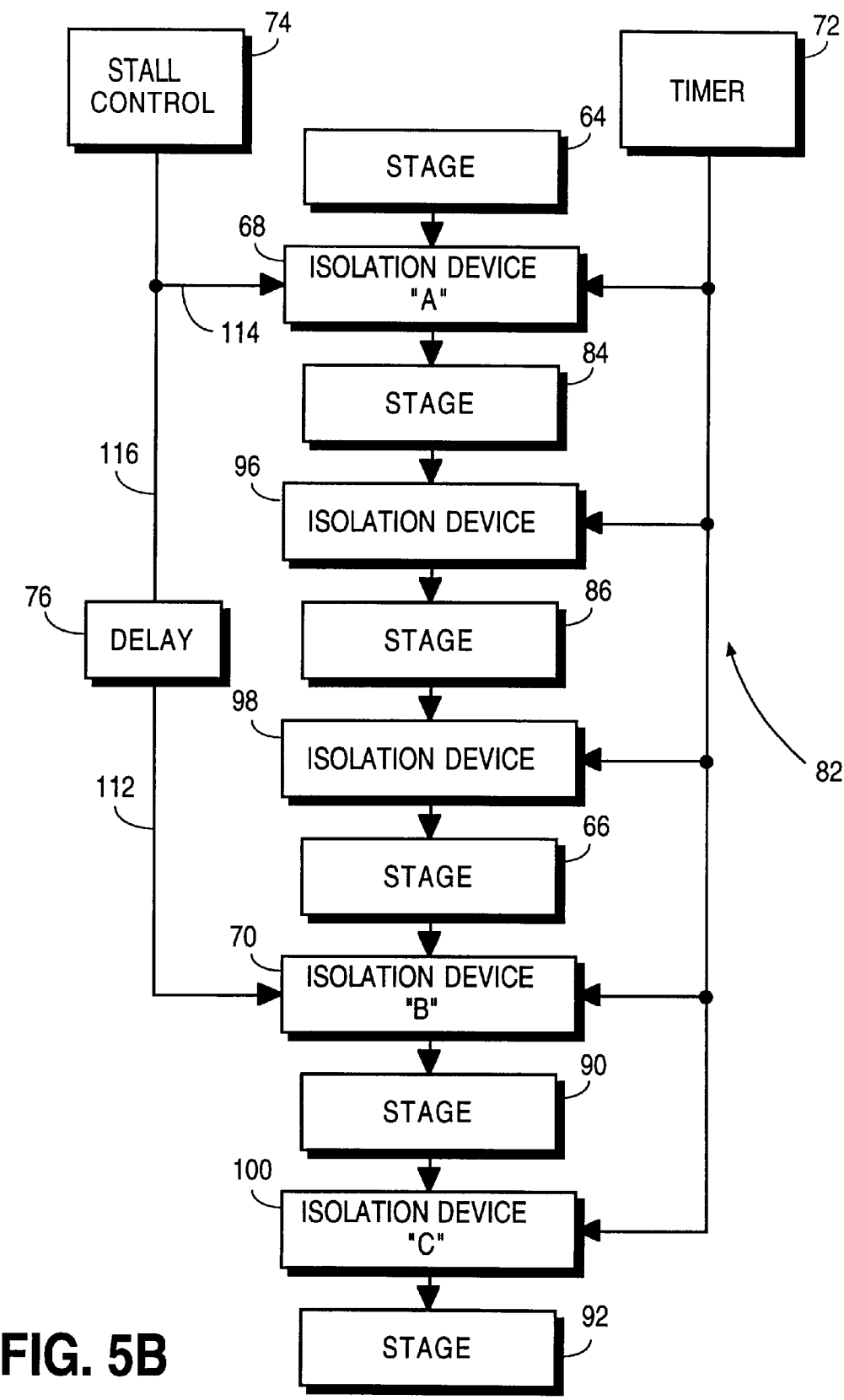
Figure 5C:
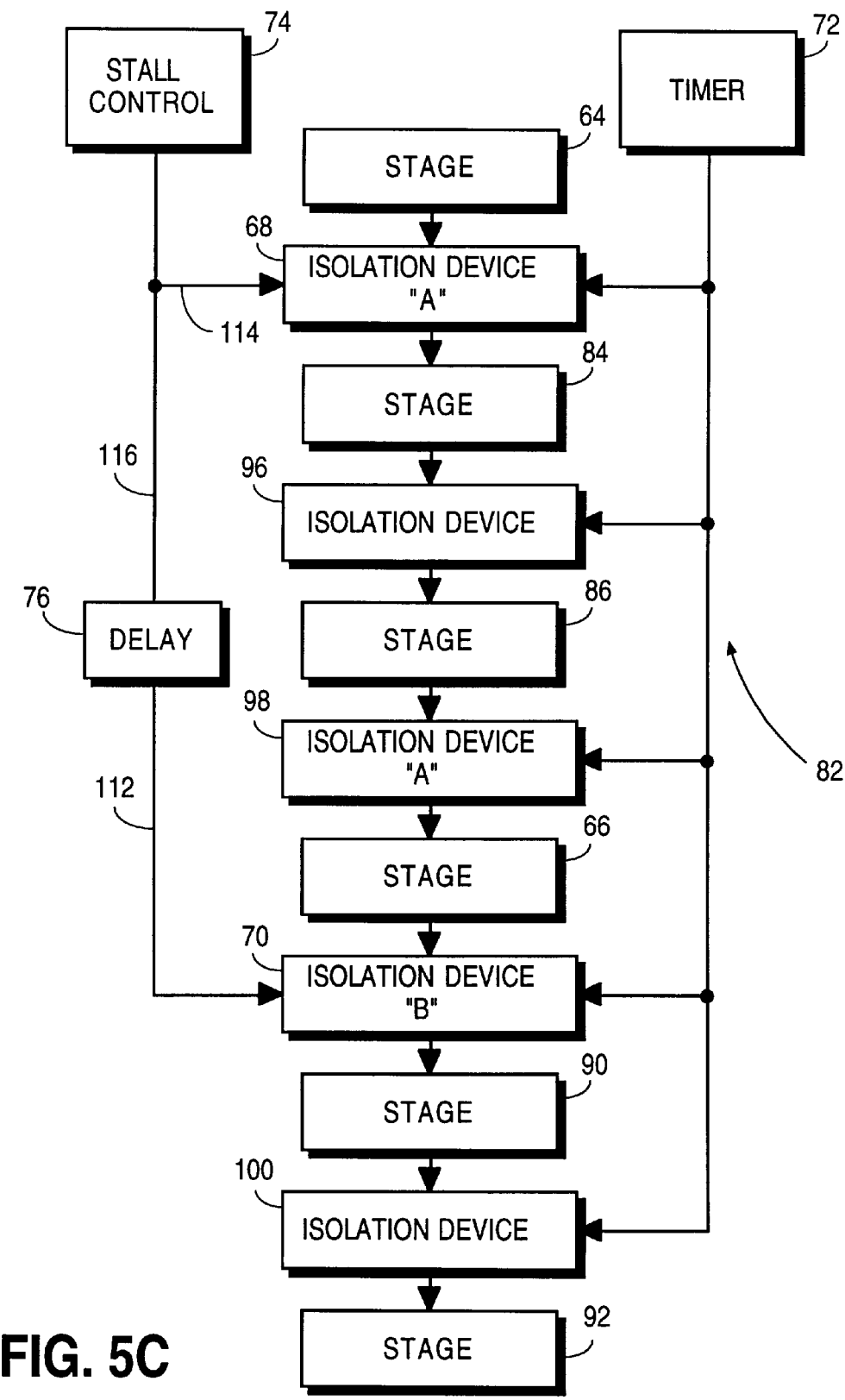

FIGS. 5(A)–(C) illustrate a pipeline 82 at three stages of operation for a specific embodiment for eliminating or moving stall latches of the pipeline 82. The pipeline 82 has a first stage 64, a second stage 66, middle stages 84, 86 between the first and second stages 64, 66, and stages 90, 92 after the second stage 66. The invention is, however, intended to cover pipelines having any number of middle stages, and any number of stages after the second stage 66 or before the first stage 64. The pipeline 82 has first and second isolation devices 68, 70 following the first and second stages 64, 66, respectively, middle isolation devices 96, 98 following each middle stage 84, 86, and isolation devices 70, 100 preceding each of the last two stages 90, 92. The isolation devices 68, 96, 98, 70, 100 are capable of storing data received from inputs that are coupled to outputs of the preceding stage 64, 84, 86, 66, 90, and are capable of transmitting stored data through outputs that are coupled to inputs of the following stage 84, 86, 66, 90, 92 in response to receiving first and second timing pulses respectively delivered by a timer 72. In some embodiments the first and second timing pulses are the same pulses. The first and second isolation devices 68, 70 are banks of stall latches. In alternate embodiments, some of the other isolation devices 96, 98, 100 may have banks of stallable latches. In the specific embodiment of FIGS. 5(A)–(C), the other isolation devices 96, 98, 100 are banks of unstallable latches or flip-flops as described below or as are known in the art. The output from the stall control 74 is sent through two lines 114, 116. The first line 114 is connected directly to the first isolation device 68, and the second line 116 passes through the delay element 76 before connecting to the second isolation device 70. In alternate embodiments, some of the other isolation devices 96, 89, 100 may be connected to the output of the stall control 74 possibly through different delay elements (not shown).

FIG. 5(A) shows the pipeline 82 at a initial time with each isolation device 68, 96, 98, 70, 100 storing execution data from a different instruction A, B, C, D, or E. For the purposes of illustration, it is assumed, that the stall control 74 is requested, by an external device (not shown), to delay instruction B from being transmitted to the fifth stage 90 for five timing pulses. To fulfill such a request, the instruction B may be delayed at any of the isolation devices 96, 98, 70 between stages two and five 68, 90. Since the first line 114 connects directly to the first isolation device 68, the stall latches thereof receive the signal and stall. Since the second line 116 connects to a delay element 76, none of the second isolation devices 70 receive the stall signal. After the stall signal is generated, data is not stored to the first isolation device 68 and data executed in the first middle stage 84 is a nonsense bubble. In some embodiments, no data stored in the first isolation device 68 is transmitted to the first middle stage 84 after the initial time. However, because of the delay element 76, the data stored in the later isolation devices 96, 98, 70, 100 continues to be transmitted to the following stages and to be further processed by the pipeline 82.

FIG. 5(B) illustrates the pipeline 82 two timing pulses later than the time of FIG. 5(A). Nonsense bubbles have appeared in two isolation devices 96, 98, and instruction B is in the second isolation device 70 which precedes the fifth stage 90. The stall signal has been finally relayed through the delay element 76 to the line 112 that connects to the stall latches of the second isolation device 70. The stall signal is still being received in the stall latches of the first isolation device 68. Further execution of the instructions A and B is now stalled. The remaining instruction C is in an unstalled isolation device 102 and will continue to progress down the pipeline at subsequent timing pulses.

The stall control 74 sends the stall signal for three timing pulses, and stops sending the signal thereafter. One timing pulse after the scenario depicted in FIG. 5(B), the first isolation device 68 unstalls, and the data from the instruction A can be transmitted to the second stage 84 thereafter. Due to the delay element 76, the stall signal continues to be delivered to the second isolation device 70 stalling the transmission of data from the instruction B to the fifth stage 90.

FIG. 5(C) illustrates the pipeline 82 five timing pulses after the start of the stall. Instruction A has been executed by the first two middle stages 84, 86, and the delayed stall signal is no longer received by the latches of the second isolation device 70. At the end of the fifth timing pulse data from instruction A will be transmitted to the second stage 66 and data from instruction B will be transmitted to the fifth stage 90. Thereafter, the pipeline 82 operates without stalls until the next stall signal is transmitted by the stall control 74.

Figure 1A:
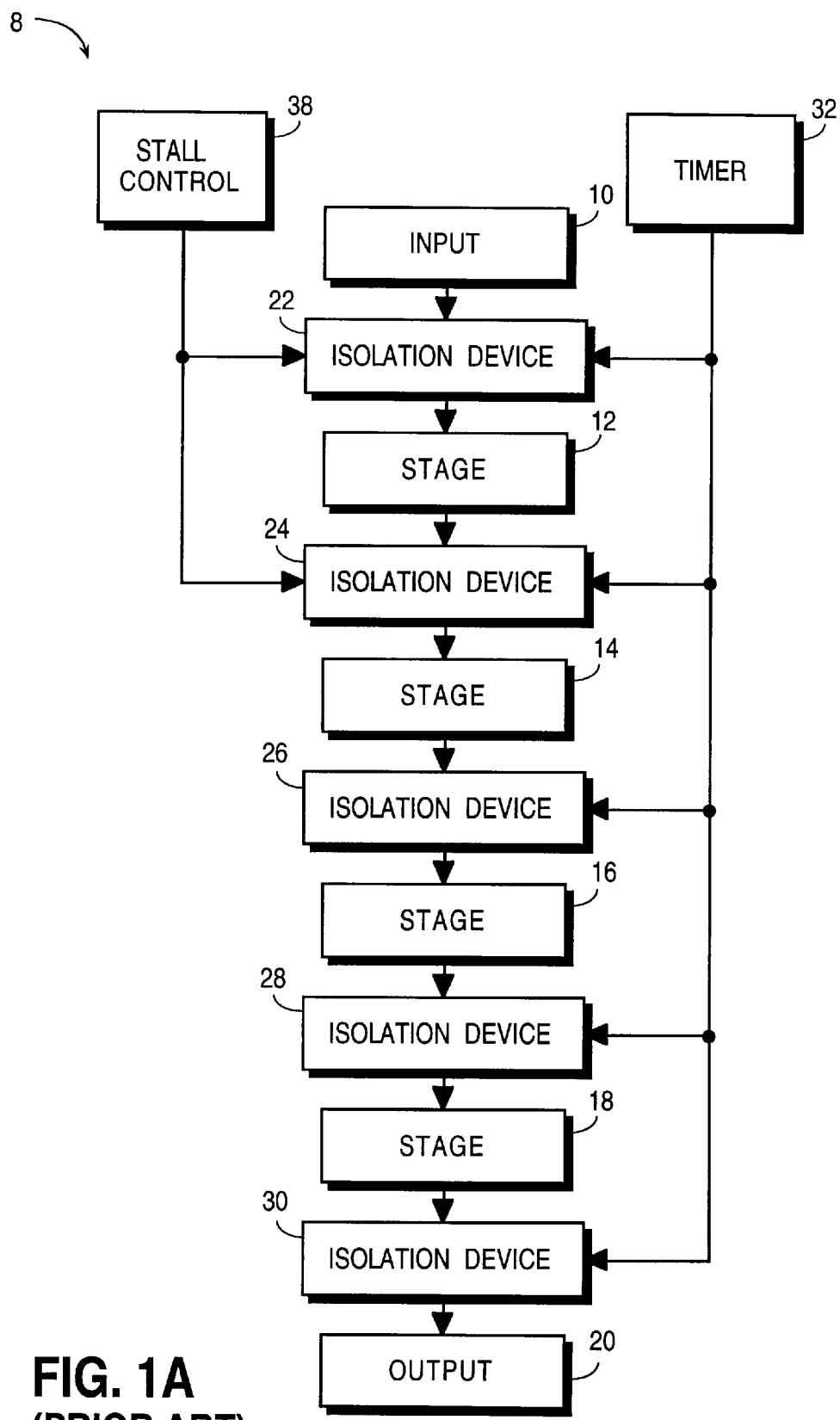
FIG. 1(A) illustrates a four stage pipeline of the prior art.
Figure 1B:
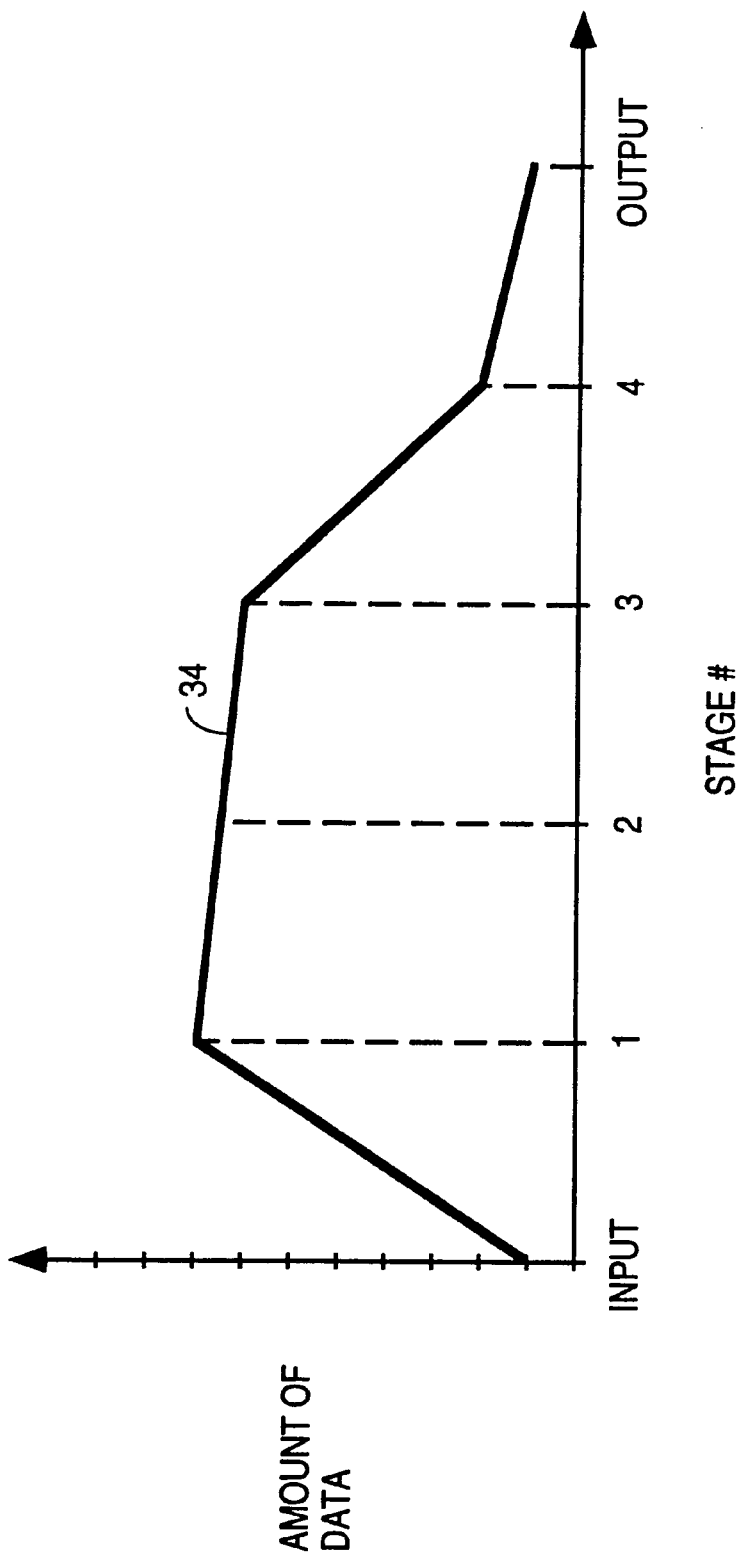
FIG. 1(B) illustrates the amount of data stored and transmitted by the isolation devices of a FMP having the form of the pipeline of FIG. 1(A)
Figure 2A:
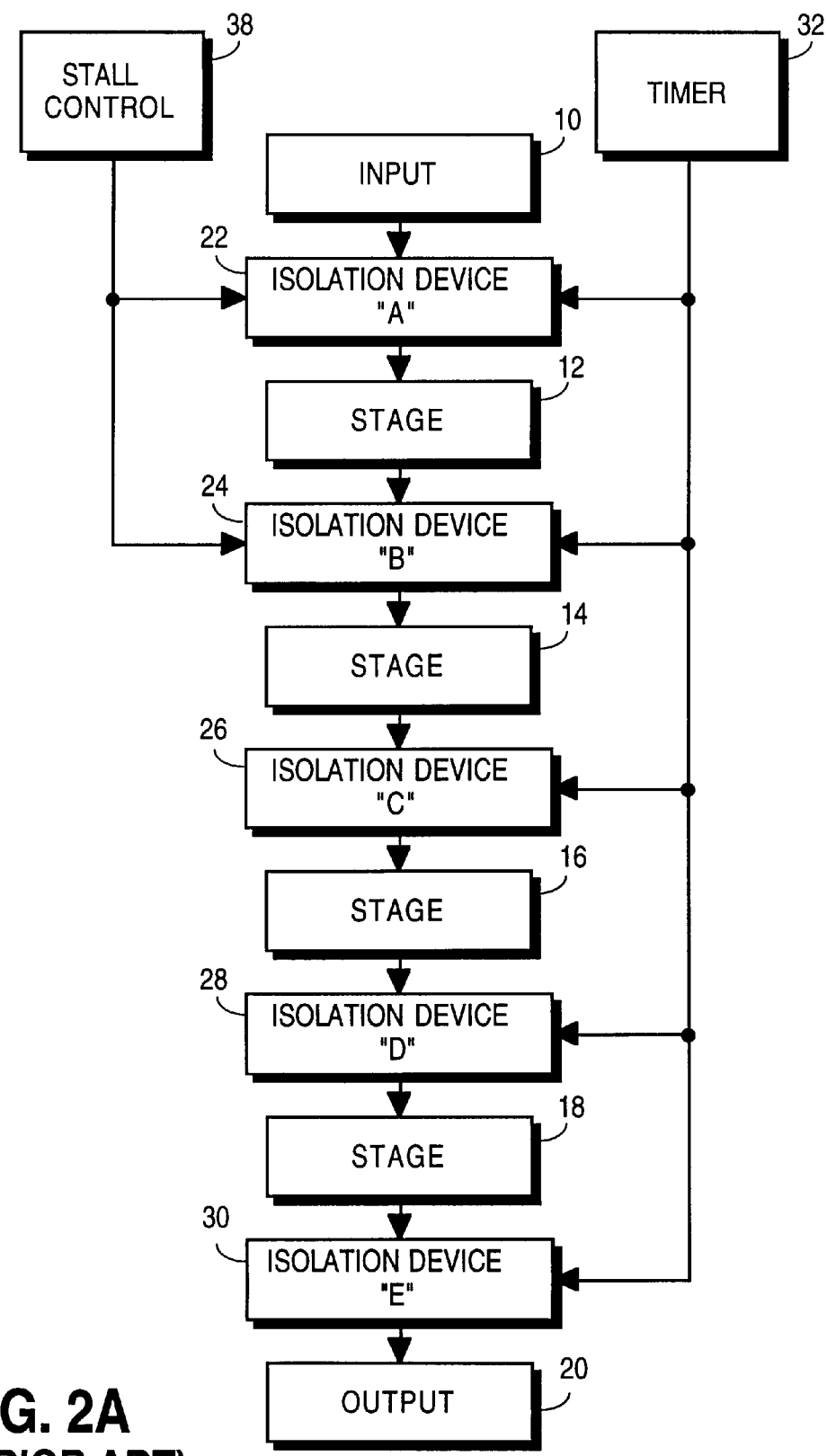
FIGS. 2(A)–(C) diagrammatically illustrates the progression of a stall in the prior art pipeline of FIG. 1(A)
Figure 2B:
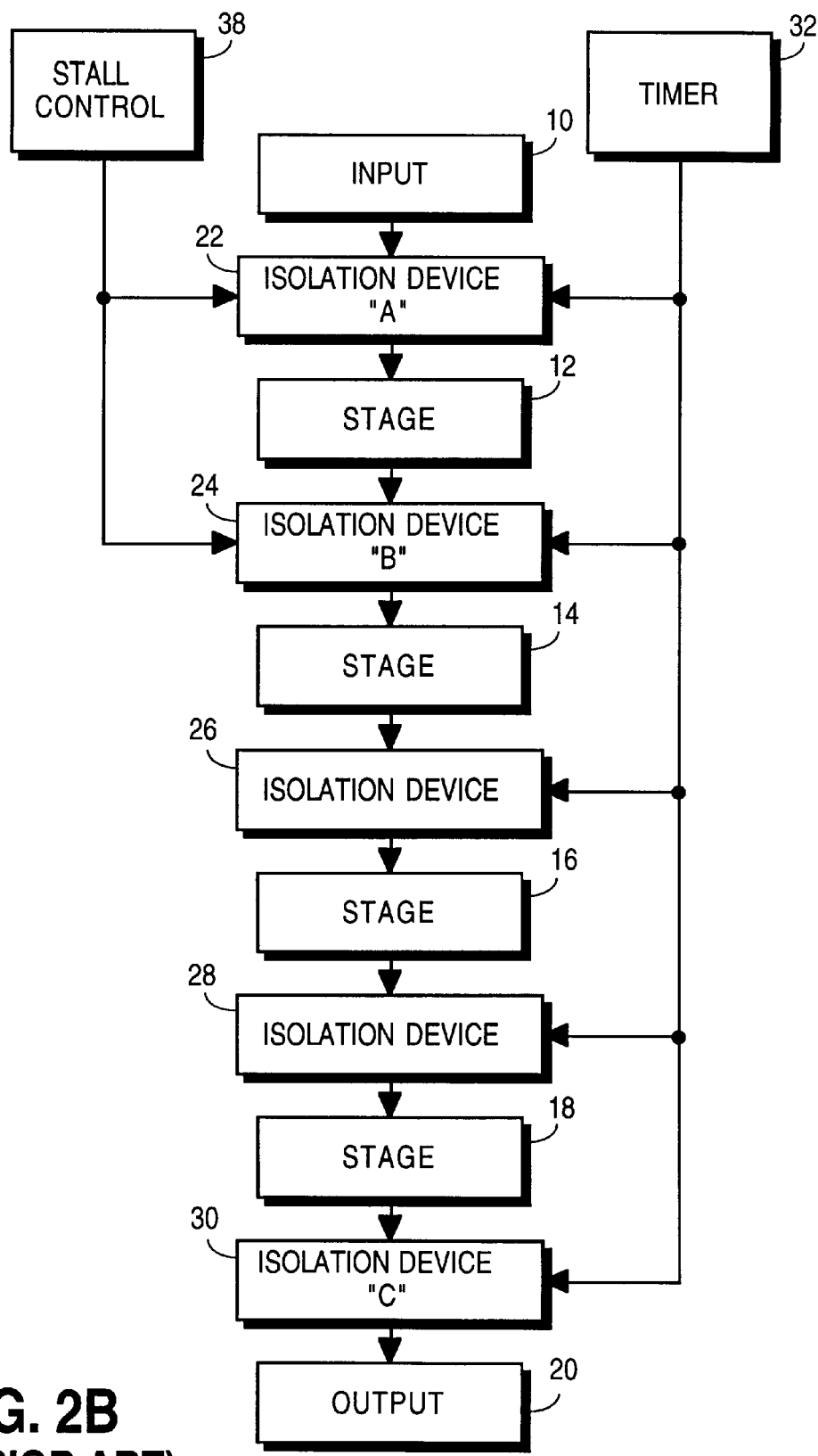
Figure 2C:
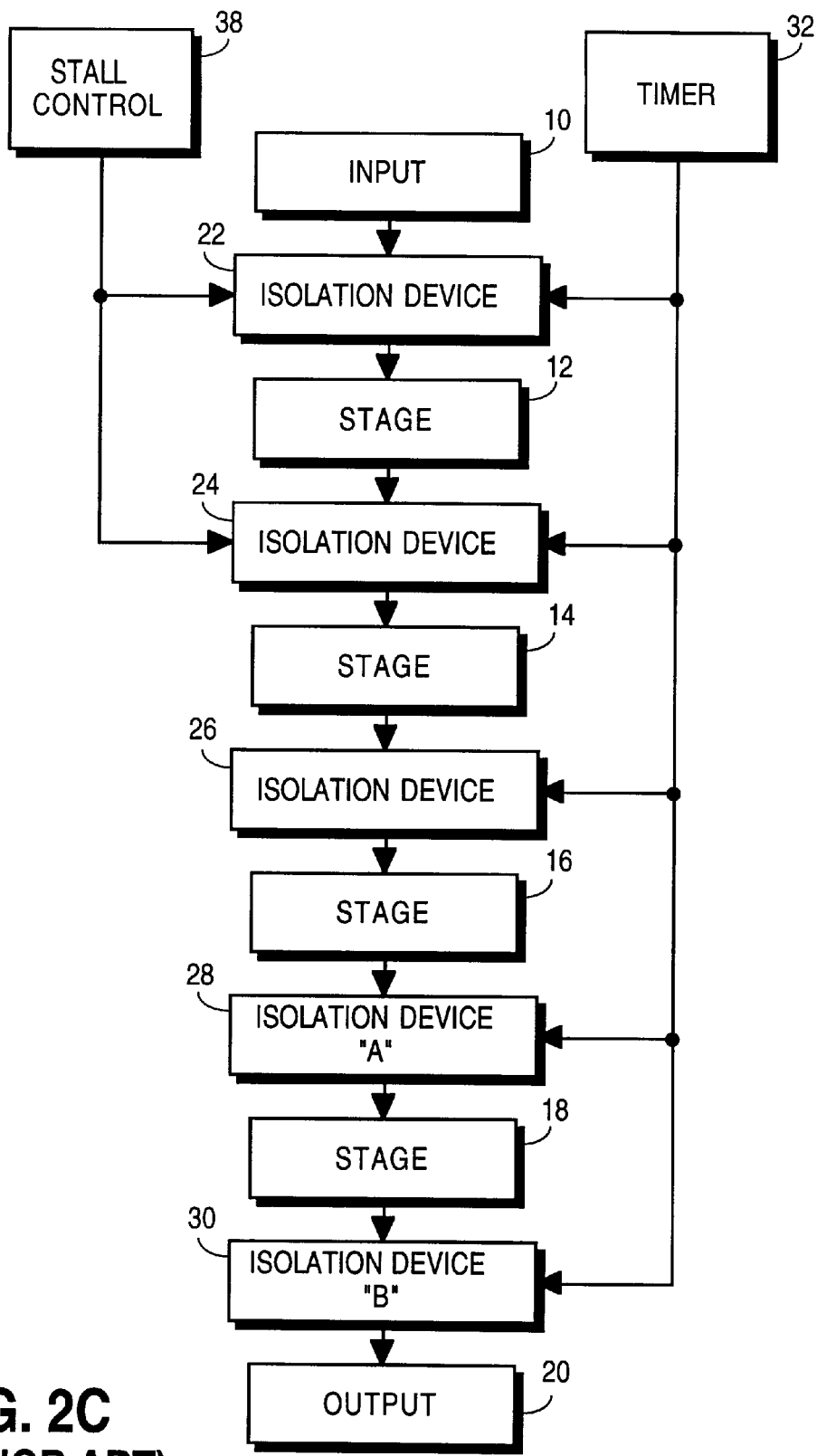

In the specific embodiment of FIGS. 5(A), (B), and (C), the isolation devices 68, 70 employ banks of stall latches. The remaining isolation devices 96, 98, 100 use banks of smaller and faster unstallable devices, i.e. generally banks of latches or banks of D flip-flops. The stall latches used to delay the data from the instruction B from being transmitted to the fifth stage 90 have been moved from an earlier isolation device, e.g., the fist middle isolation device 96, in the prior art pipeline of FIGS. 1(A), and 2(A)–(C), to a later isolation device, e.g., the second isolation device 70, in the embodiment of FIGS. 5(A)–(C). The delay element 76 may generally be added to move the location of stall latches to the later isolation device in the pipeline 82, if the designer of the pipeline knows that delays will not be needed before a later pipeline stage and that the need for the delay will be requested at least a fixed number of timing pulses in advance. The designer may move stall latches from one isolation device to another to reduce the total number of stall latches employed and thereby increase the speed and decrease the overall area occupied on a chip by the pipeline 82. The number of stall latches would be reduced if the designer moved the stall latches from an isolation device using more latches, for example the isolation device 24 between the first and second execution stages 12, 14 in FIGS. 1(A) and 1(B), to an isolation device using fewer latches, for example the isolation device 28 between the third and fourth execution stages 16, 18 of FIGS. 1(A) and 1(B). Several banks of stall latches and types of delay elements may be employed in a specific embodiment.

Figure 3:
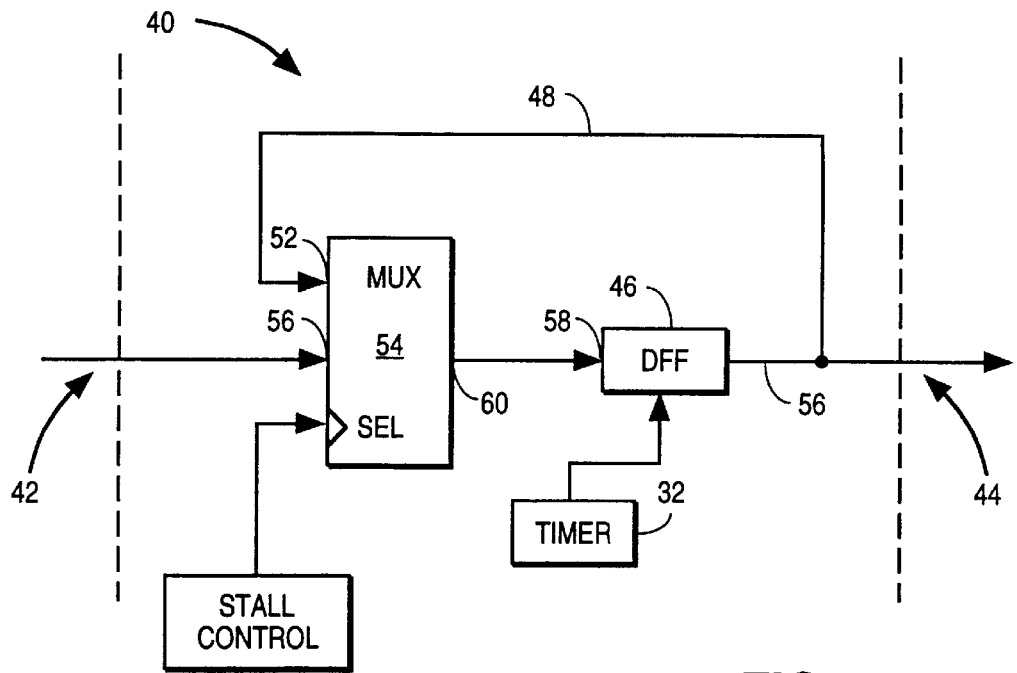
FIG. 3 illustrates a stall latch.
Figure 6:
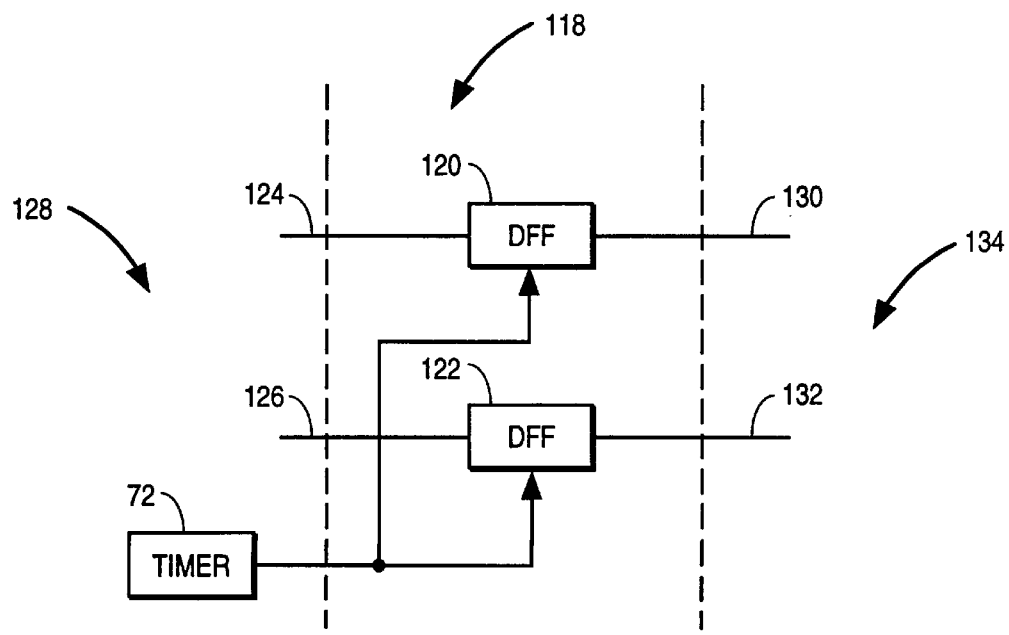
FIG. 6 illustrates a flip-flop used by unstallable isolation devices of the specific embodiment of FIGS. 5(A)–(C).

FIG. 6 illustrates a bank 118 of unstallable D flip-flops 120, 122. The bank 118 of DFF's 120, 122 may be used to construct the unstallable isolation devices of FIGS. 5(A)–(C), e.g., the isolation devices 96, 98, 100. The input 124, 126 of each DFF 120, 122 is connected to outputs from an preceding stage 128 of the pipeline. The outputs 130, 132 of the DFF's 120, 122 are connected to inputs of the following stage 134 of the pipeline. The timer 32 triggers the storage of data and the transmission of stored data by the DFF's 120, 122. The DFF's 120, 122 are faster than stall latches and occupy substantially less area on a chip due to the absence of supplemental elements such as the multiplexer 54 illustrated in the stall latch of FIG. 3.

All the methods and apparatus disclosed and claimed herein may be made and executed without undue experimentation in light of this specification. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A pipeline, comprising:
   a first, second and at least one middle stage, each having an output, said first stage being located before said middle stage and said second stage being located after said middle stage in the pipeline;
   a first isolation device having an input coupled to the output of the first stage, said first isolation device for storing data received from said first stage;
   a second isolation device having an input coupled to the output of said second stage, said second isolation device for storing data received from said second stage;
   at least one middle isolation device, an input of one of said middle isolation devices being couple to the output of one of said middle stages, said middle isolation device for storing data received from the middle stage coupled thereto;
   a stall control for sending a signal to said first and second isolation devices, said signal for stalling said isolation devices; and
   at least one delay element being connected between the stall control and the second isolation device, said delay elements to delay receipt of said signal by said second isolation device.

2. The pipeline as set forth in claim 1, wherein an input of said first stage is the input of said pipeline.

3. The pipeline as set forth in claim 1, further comprising a timer to deliver a plurality of timing pulses, said first, second, and middle isolation devices receiving said plurality of timing pulses, said first, second, and middle isolation devices each storing data in response to receiving at least one of said plurality of timing pulses.

4. The pipeline as set forth in claim 3, wherein said signal stalls said first and second isolation devices from storing data during at least the time between two of said plurality of timing pulses.

5. The pipeline as set forth in claim 3, wherein said stall control adjustable to send said signal during a selectable number of said plurality of timing pulses.

6. The pipeline as set forth in claim 3, further comprising at least one stage following at least one of said first, second, and middle isolation devices, and wherein said first, second, and middle isolation devices are adapted to transmitting stored data to the following stage.

7. The pipeline as set forth in claim 6, wherein said first, second, and middle isolation devices transmit stored data is response to receiving one of said plurality of timing pulses.

8. The pipeline as set forth in claim 6, wherein said signal stalls said first and second isolation devices from transmitting stored data.

9. The pipeline as set forth in claim 3, wherein said first isolation device is connected to an input of one of said middle stages and one of said middle isolation devices is connected to an input of said second stage.

10. The pipeline as set forth in claim 1, wherein said middle isolation device is selected from the group consisting of banks of D flip-flops and banks of unstallable latches.

11. The pipeline as set forth in claim 9, wherein, in response to receiving one of said plurality of timing pulses, said first isolation device transmits stored data to said middle stage and said middle isolation device transmits stored data to the second stage.

12. The pipeline as set forth in claim 3, wherein said first and second isolation devices are banks of stall latches and wherein all said latches store data in response to receiving one of said plurality of timing pulses.

13. The pipeline as set forth in claim 1, wherein said pipeline is adapted to executing floating point multiplication.

14. A processor having a pipeline, said pipeline comprising:
    first, second, and at least one middle stage, said first stage located before said middle stage and said second stage located after said middle stage;
    first, second and at least one middle isolation devices, said first isolation device connecting said first stage to an input of said middle stage, said second isolation device connecting to an output of said second stage;
    a timer for delivering a plurality of timing pulses to said isolation devices, at least one of said plurality of timing pulses triggering each of said isolation devices to store data from the stage therebefore;
    a stall control for stalling said first and second isolation devices from storing data by sending a stall signal thereto; and
    a delay element for delaying the reception of said stall signal by said second isolation device during at least one timing pulse.

15. The processor as set forth in claim 14, wherein said stall control being adjustable to send said stall signal during a selectable number of said plurality of timing pulses.

16. The processor as set forth in claim 14, wherein each of said isolation devices is connected to a following stage and is adapted to transmitting stored data to the following stage, said isolation devices transmitting stored data in response to receiving one of said plurality of timing pulses.

17. The processor as set forth in claim 16, wherein said stall signal stalls said first and second isolation devices from transmitting stored data.

18. The processor as set forth in claim 14, wherein said middle isolation device is selected from the group consisting of banks of D flip-flops and banks of unstallable latches.

19. The processor as set forth in claim 14, wherein said first and second isolation devices are banks of stall latches and wherein all of said stall latches stall in response to receiving said stall signal.

20. The processor as set forth in claim 14, wherein said pipeline is adapted to executing floating point multiplication.

21. A method for operating a pipeline, comprising:
    sending a plurality of timing pulses to a first, second, and middle isolation device;
    storing data from a first stage of said pipeline to said first isolation device in response to receiving each of said plurality of timing pulses unless said first isolation device is stalled.

storing data from a middle stage of said pipeline to said middle isolation device in response to periodically receiving one of said plurality of timing pulses;

storing data from a second stage of said pipeline to said second isolation device in response to receiving each of said plurality of timing pulses unless said second isolation device is stalled;

sending a signal to said first and second isolation devices, said first and second isolation devices stalling in response to receipt of said signal; and delaying the receipt of said signal by said second isolation device by at least one of said plurality of timing pulses.

22. The method as set forth in claim 21, wherein said step of storing data to said first isolation device stores data from an input of said pipeline.

23. The method as set forth in claim 21, wherein said step of sending a signal is adjustable to continue sending said signal during a selectable number of said plurality of timing pulses.

24. The method as set forth in claim 21, further comprising transmitting stored data from said first, second, and middle isolation devices to a stage following said isolation devices, and wherein said first, second, and middle isolation devices transmit stored data in response to receiving one of said plurality of timing pulses.

25. The method as set forth in claim 24, wherein said step of sending a signal stalls said first and second isolation devices from transmitting stored data in response to receipt thereof.

26. The method as set forth in claim 21, wherein said step of storing data to said middle isolation device stores data to banks of D flip-flops or banks of unstallable latches.

\* \* \* \* \*